Dec. 30, 1958    L. H. LEONARD    2,866,608
VERTICAL-TAKE-OFF TYPE AIRCRAFT WITH
JET DRIVEN ROTOR SYSTEM
Filed May 18, 1955
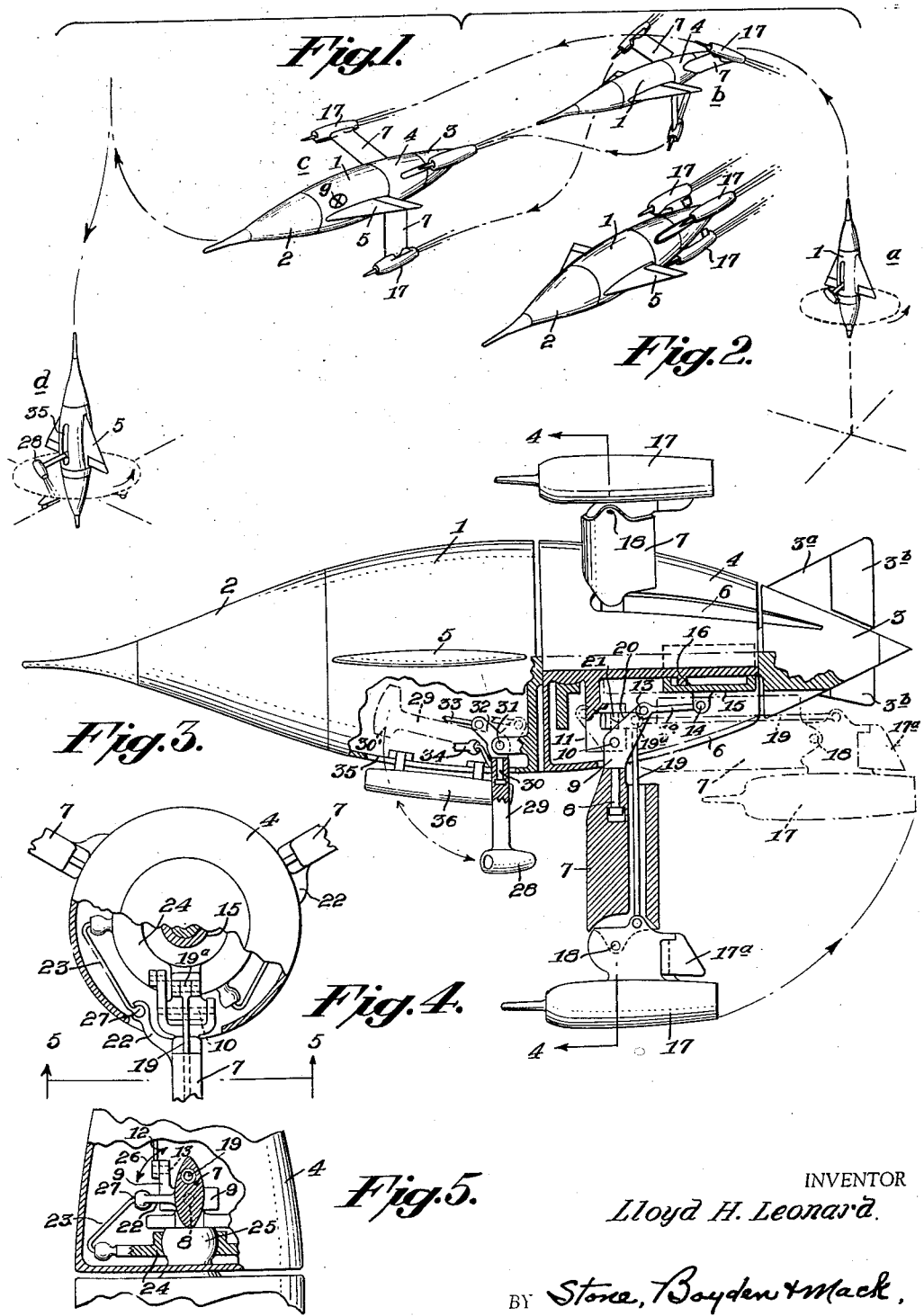
INVENTOR
Lloyd H. Leonard.
BY Stone, Boyden & Mack,
ATTORNEYS United States Patent Office 2,866,608
Patented Dec. 30, 1958

2,866,608

VERTICAL-TAKE-OFF TYPE AIRCRAFT WITH JET DRIVEN ROTOR SYSTEM

Lloyd H. Leonard, Inglewood, Calif.

Application May 18, 1955, Serial No. 509,350

4 Claims. (Cl. 244—7)

This invention relates to aircraft, and more particularly to aircraft of the vertical-take-off type, such as shown in my prior Patent No. 2,479,125, issued August 16, 1949.

In said prior patent I disclosed an aircraft having an elongated fuselage comprising a rotor section intermediate its ends, with propeller blades projecting radially from such rotor and having propulsion jets at their ends. The blades were of the variable pitch type and the jets were so arranged that, when the blades were adjusted to an acute angle to the plane of rotation, the jets served to rotate the blades, but when the blades were adjusted to full feathered position, i. e., at right angles to the plane of rotation, the jets served to exert a direct forward thrust to propel the craft.

The present invention is directed to an aircraft of this same general type.

In said patent, however, the blades remained at all times in a radially extending position, and excessive power was required to achieve high speeds because of the air resistance offered by these blades.

An object of the invention is to devise means by which, after the vertical climb, and after a sufficiently high speed has been attained in horizontal flight, the blades may be folded radially inwardly, thus greatly reducing the air resistance, and enabling the craft to attain supersonic speed with much less power.

A subsidiary object is to so arrange the jets that, when the wings are thus folded, the jets are also swung inwardly toward the fuselage, but are maintained in a position parallel with the line of flight so that they exert a direct forward thrust to propel the craft.

A further object of the invention is to provide improved means for counteracting or compensating for the torque due to the rotation of the blades about the longitudinal axis of the fuselage, and to devise means whereby the torque-compensating force may be varied as desired.

In order that the invention may be readily understood, reference is had to the accompanying drawing forming a part of this specification and in which:

Fig. 1 is a diagrammatic view illustrating the method of flight of my improved aircraft;

Fig. 2 is a perspective view showing the appearance of the craft when in flight at high speeds;

Fig. 3 is a side elevation on an enlarged scale, parts being broken away and parts shown in section;

Fig. 4 is a transverse section substantially on the line 4—4 of Fig. 3, parts being shown in elevation and parts being broken away; and Fig. 5 is a fragmentary sectional elevation showing a portion of the rotor, and looking in the direction of the arrows 5—5 of Fig. 4.

As in my said prior patent, the present aircraft includes an elongated fuselage 1 having a nose section 2, a tail section 3 and a rotor section 4 disposed at a point intermediate the length of the fuselage and preferably adjacent the tail section thereof.

Delta-type wings 5 project from opposite sides of the fuselage, and the tail section 3 may be provided with a fin 3a and rudders 3b.

The rotor section 4 is formed with a series of axially extending slots 6 and through these slots project propeller blades 7. Each of these blades is mounted for pivotal movement about its longitudinal axis on a shaft 8, carried by an arm 9 pivoted at 10 to a fixed support 11. The other end of the arm 9 is pivoted at 13 to one end of a link 12, the other end of which is pivotally connected at 14 to a movable hydraulic cylinder 15 working over a fixed piston 16.

From this it will be obvious that when motive fluid is admitted to one side or the other of the piston 16 the cylinder 15 will move endwise, thus swinging the arm 9 and blade 7 about its pivot 10. When the cylinder 15 moves to the left as indicated by broken lines, the blade 7 will be swung rearwardly into the dotted line position shown in Fig. 3 in which its longitudinal axis lies substantially parallel with the line of flight. It will be understood that all three blades 7 are connected to the cylinder 15 as shown, so that when the cylinder moves, all of the blades are simultaneously folded rearwardly as described.

Mounted at the end of each blade is a jet engine 17 shown as a supersonic ram jet type of engine. This is pivotally secured to the end of the blade as at 18, and is also pivotally connected with a rod 19 extended longitudinally through a channel in the blade and pivotally connected at its inner end, as indicated at 19a, to a block 20 mounted on a pivot 21 which is in alignment with the shaft 8.

From the foregoing it will be seen that when the blade is folded rearwardly by means of the cylinder 15 as described, the rod 19 will swing the jet engine 17 on the pivot 18 so as to bring such jet engine into a final position in which it lies parallel with and alongside the blade 7 and also parallel with the line of flight, as shown in broken lines in Fig. 3.

Referring now to Figs. 4 and 5 it will be seen that I provide each blade with a rigid arm 22, the end of which is connected by a link 23 with a plate 24 mounted for universal movement on a fixed hub 25. When the plate 24 is rotated by suitable means (not shown) each of the blades 7 will be swung about the shaft 8 in the direction indicated by the arrow 26, thus varying the angle or pitch of the blades. It will be noted that the connection 27 between the arm 22 and link 23 is disposed in line with the pivot 10 so as to avoid binding when the blades are folded.

From the foregoing it will be understood that the jet engines 17 extend transversely of the length of the blades 7 and that when the blades are adjusted to a position at an acute angle to the plane of rotation the jet engines operate to drive the blades and cause them to rotate in the manner shown and described in my said prior patent. In Fig. 1 the vertical take-off position is shown at $a$ and when taking off in this way the pitch of the blades is set at a relatively small angle as described in my said prior patent. As the craft gains speed this angle may be gradually increased until the craft is shifted to a position for horizontal flight, as shown in $b$ in Fig. 1. Subsequently the blades may be shifted to full feathered position as shown at $c$ in Fig. 1, and in this position the jet engines provide a direct forward thrust to propel the craft, as in my said prior patent.

The landing position of the craft is indicated at $d$ in Fig. 1, it being understood that the craft is provided with suitable landing gear, as in my said prior patent.

After sufficient speed has been attained, the blades are folded rearwardly into the position shown in broken lines in Fig. 3 and in full lines in Fig. 2, in which position the blades lie within the slots 6 with their length substantially parallel to the longitudinal axis of the fuselage. The jet engines 17 also extend substantially parallel to such longitudinal axis or line of flight and serve to directly propel the craft as indicated in Fig. 2. The folding of the blades into this position and the propulsion of the craft by the direct forward thrust of the jet engines is desirable for attaining supersonic speeds.

The turning of the rotor 4 about the longitudinal axis of the fuselage as described tends to produce a bearing friction torque, and to counteract and overcome this torque and also to aid in maneuvering during vertical flight.I provide special means in the nature of an auxiliary jet 28. This is carried by an arm 29 mounted on an axially disposed pivot 30, and this in turn is pivotally connected at 31 to a fixed support. An arm 32, rigid with the arm 29, is connected by a control rod 33 with means (not shown) by which the arm 29 and jet 28 may be swung about the pivot 31 into folded position as shown in dotted lines. The arm 29 works freely in a slot 35 formed in the fuselage and provided with a suitable door 36. When the arm 29 is swung to folded position inside of the fuselage as shown in dotted lines, this door may be closed.

The jet 28 may be angularly adjusted on the pivot 30 as by means of a control rod 34 or by other suitable means.

From the foregoing it will be seen that the jet 28 is so directed as to exert a torsional thrust on the fuselage, counteracting the torque due to the turning of the rotor 4 on its bearings, and it will be seen that by adjusting the angle of the jet 28 by means of the control rod 34 the amount of this torque-compensating force can be varied as required so that it may be made to exactly balance the torque due to the rotor and thus prevent objectionable displacement of the fuselage about its longitudinal axis.

I claim:

1. In an aircraft, an elongated fuselage, propeller blades mounted for rotation about the longitudinal axis thereof and when in operation extending radially of said axis, propulsion jet engines mounted at the tips of said blades and disposed transversely of the length of the blades when the blades are extended, and means whereby said blades and jet engines may be folded rearwardly into a position substantially parallel with each other and with said axis, said means including a pivotal connection between each jet engine and its associated blade.

2. In an aircraft, an elongated fuselage, propeller blades mounted for rotation about the longitudinal axis thereof and when in operation extending radially of said axis, propulsion jet engines mounted at the tips of said blades and disposed transversely thereof when the blades are extended, means whereby said blades may be folded rearwardly into a position substantially parallel with said axis, and means whereby, when said blades are thus folded, said jet engines are shifted into a position substantially parallel with the length thereof.

3. In an aircraft having variable pitch propeller blades mounted to rotate about an axis substantially parallel with the line of flight, jet engines carried by said blades for causing them to rotate when adjusted to an acute angle to the plane of rotation, means for folding said blades to a position in which their longitudinal axis extends parallel with the line of flight, and means whereby, when said blades are thus folded, said jet engines are also shifted rearwardly to a position in which they lie substantially parallel to the line of flight.

4. In an aircraft having variable pitch propeller blades mounted to rotate about an axis substantially parallel with the line of flight, jet engines carried by said blades for causing them to rotate when adjusted to an acute angle to the plane of rotation, means for folding said blades to a position in which their longitudinal axis extends parallel with the line of flight, and means whereby, when said blades are thus folded, said jet engines are shifted to a position in which they exert a direct propulsive force on said aircraft.

References Cited in the file of this patent

UNITED STATES PATENTS

| | | |
|---|---|---|
| 2,330,056 | Howard | Sept. 21, 1943 |
| 2,422,744 | O'Neil | June 24, 1947 |
| 2,485,502 | McCollum | Oct. 18, 1949 |
| 2,540,991 | Price | Feb. 6, 1951 |
| 2,568,812 | Lee | Sept. 25, 1951 |
| 2,684,213 | Robert | July 20, 1954 |

FOREIGN PATENTS

| | | |
|---|---|---|
| 971,767 | France | Aug. 16, 1950 |
| 1,006,380 | France | Jan. 23, 1952 |